(12) United States Patent
Mountain

(10) Patent No.: US 7,428,730 B2
(45) Date of Patent: Sep. 23, 2008

(54) SOFTWARE DEVELOPMENT ENVIRONMENT

(75) Inventor: Highland Mary Mountain, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 657 days.

(21) Appl. No.: 10/737,125

(22) Filed: Dec. 15, 2003

(65) Prior Publication Data

US 2005/0132327 A1    Jun. 16, 2005

(51) Int. Cl.
*G06F 9/45* (2006.01)
(52) U.S. Cl. .................. 717/148; 717/142; 717/143; 717/147
(58) Field of Classification Search .......... None
See application file for complete search history.

(56) References Cited

U.S. PATENT DOCUMENTS

| | | | |
|---|---|---|---|
| 6,317,799 B1* | 11/2001 | Futral et al. | 710/22 |
| 2004/0047361 A1* | 3/2004 | Fan et al. | 370/411 |
| 2004/0093389 A1* | 5/2004 | Mohamed et al. | 709/212 |
| 2004/0216097 A1* | 10/2004 | Sun | 717/154 |

OTHER PUBLICATIONS

Jim Pinkerton, "Winsock Direct: The Value of System Area Networks", Microsoft Windows 2000 Server, May 2001, pp. 1-22.*
Microsoft Computer Dictionary, Fifth Edition, 2002, p. 232.*

* cited by examiner

*Primary Examiner*—Chuck Kendall
(74) *Attorney, Agent, or Firm*—Blakely, Sokoloff, Taylor & Zafman LLP

(57) ABSTRACT

A method and system for programming a software development environment to reserve memory space for direct access by a remote direct memory program.

5 Claims, 4 Drawing Sheets

SOFTWARE DEVELOPMENT ENVIRONMENT

BACKGROUND

1. Technical Field

Specific matter disclosed herein relates to the field of managed runtime environments (MRTE).

2. Background Information and Description of Related Art

Of particular relevance to embodiments of the present invention is RDMA over IP technology. RDMA ("Remote Direct Memory Access") technology or environments, among other things, may use a NAC (Network Accelerator Card) to connect IP storage to networks and servers. RDMA products, e.g, RDMA programs and processes or "remote direct memory processes/programs", aim to help IT users decrease network latency and administration costs by supporting a zero copy model for incoming data to minimize the demands on host memory bandwidth associated with high speed networking. In other words, RDMA enables the reduction of data copy operations that are found in communication programs such as TCP/IP (Transmission Control Protocol/Internet Protocol). TCP/IP is understood to be one of the basic communication languages or protocols of the Internet.

This demand reduction leads to RDMA protocol being used to reduce demands on both CPUs (Central Processing Units) and memory resources because, first, much of the overhead of protocol processing may be moved to an Ethernet adapter and, second, each incoming network packet has enough information to allow it to be placed directly into final destination memory. These advantages of RDMA are particularly useful as companies develop, for example, 10 Gigabit Ethernet products.

RDMA is a technology that may be used in numerous types of digital products. For example, RDMA may be used with NICs (Network Interface Controllers), Embedded Transport Acceleration (ETA), Managed Runtime Environments (MRTEs), Direct Data Placement (DDP), Network Interface Adapter Drivers, APIs (Application Program Interfaces), Application Memory Buffers, Infiniband, etc. RDMA is also sometimes referred to herein as RDMAP, meaning, "RDMA Protocol."

An MRTE is a programming environment which typically provides ULP (described later herein) services for RDMA processes. The MRTE provides code libraries with rich functionality and several core components which free up the developer to concentrate their efforts on system solution requirements. MRTE programming environments provide for automatically managing many computing aspects, such as memory management and dynamic compilation, some of which were the burden of the application developer years ago. An MRTE is an intermediary programming environment that communicatively couples to the OS to consume computing resources such as CPU processing and system memory. In other words, the MRTE may be considered to be an entity that is located above, or "on top" of an operating system (OS) and processes information through the CPU that is hosting the OS, i.e., the MRTE consumes CPU resources, such as memory allocations, to operate.

The RDMAP specification defines a ULP as follows:
ULP—Upper Layer Protocol: The process layer above the RDMAP process layer (RDMA/DDP). The ULP for RDMA/DDP is expected to be something like an OS (Operating System), Application, adaptation layer, or proprietary device. The RDMA/DDP documents do not specify a ULP—they provide a set of semantics that allow a ULP to be designed to utilize RDMA/DDP.

Typically, RDMA implements the MRTE in this ULP role and the RDMA asserts that there must be a means for the MRTE ULP to interact with an RDMA process. An RDMA process may execute an MRTE as the ULP. This involves following the RDMAP interactions with the ULP criteria mapped out by the RDMAP specification while preserving the expected behaviors of the given MRTE with respect to JIT processing, class loading, garbage collection, or network I/O.

JIT processing may be understood with reference to Java programming language. In the Java programming language and environment, a "just-in-time" (JIT) compiler is a program that turns Java bytecode (a program that contains instructions that must be interpreted) into instructions that can be sent directly to the processor.

"Class loading" may be understood to be the process in which an application's class is assembled during runtime (either from cache or by JIT compiling it) and loads the class' methods, interfaces, and variables into memory.

"Garbage collection" may refer to a memory manager which monitors memory usage and frees up memory which will most likely not be referenced by a running program again and then organizes free memory to allow for the largest contiguous buffer which can be used by the running program.

By "network I/O" is meant network data transmissions to and from a network device (defined later herein), often via a communications protocol such as TCP/IP.

RDMAP is designed to simplify application development. Section 5.2 "RDMAP Interactions with the ULP" of the RDMA Protocol Specification, 21 Oct. 2002 describes the interactions between the RDMAP and the ULP.

Relevant to the present disclosure is a TCP Offload Engine (TOE, not shown). A TOE is a specialized (intelligent) network adapter that moves much of the TCP/IP protocol processing overhead from the host CPU/OS to the network adapter. While TOEs can reduce much of the TCP/IP protocol processing burden from the main CPU, it does not directly support zero copy of incoming data streams. RDMA directly supports a zero copy model for incoming data to minimize the demands on host memory bandwidth associated with high-speed networking.

BRIEF DESCRIPTION OF DRAWINGS

The invention may best be understood by referring to the following description and accompanying drawings that are used to illustrate embodiments of the invention. In the drawings.

DETAILED DESCRIPTION

Figure 1:
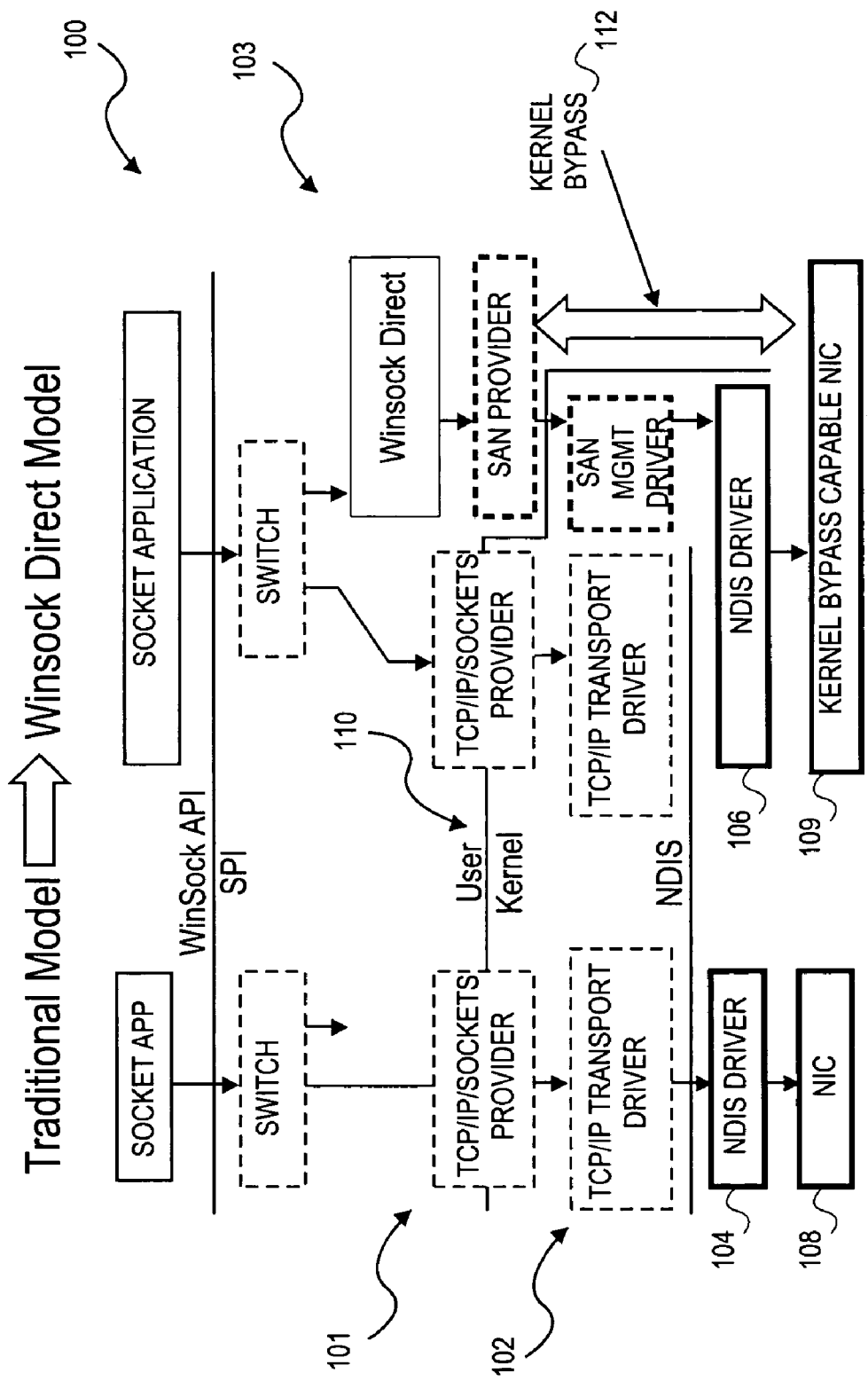
FIG. 1 illustrates a computer system according to an exemplary embodiment of aspects according to certain principles of the present invention.

A "software development environment" as referred to herein relates to a programming environment that operates, at least in part, through network communications. "Network communications" have evolved in dramatic fashion over at least the past decade. For example, LANs (Local Area Networks), WANs (Wide Area Networks), GANs (Global Area Networks), and the Internet have become more and more widely used with improvements in technology and may collectively be considered to be 'communication networks' at least when operating via network communications. Network communications may be considered as the transmission of data between network elements or nodes. As will be understood by one of ordinary skill in the art and viewing this disclosure, this transmission may be the sending or the receiving of data.

A "communication network" as referred to herein relates to a plurality of entities that may exchange data through a data transmission medium. In one example, each entity in the communication network may be associated with an "address" that is used for transporting data to the entity according to a data communication protocol. However, this is merely an example of a communication network and embodiments of the present invention are not limited in this respect.

An "Internet connection" as referred to herein relates to a means for accessing any one of several entities coupled to a communication network known as the "Internet." The Internet comprises a networking infrastructure comprising a network of networks. An entity on the Internet may be associated with a "globally routable Internet Protocol (IP) address" which may be used for addressing data transmissions according to an Internet Protocol. An Internet connection may be provided by any one of several commercial Internet Service Providers (ISPs). An ISP may forward a message from a subscriber to any one of several entities on the Internet according to a globally routable IP address associated with the entity. However, these are merely examples of an Internet connection and embodiments of the present invention are not limited in these respects.

A "local network" as referred to herein relates to a communication network having entities that communicate according to a locally defined data communication protocol. For example, each entity in a local network may be associated with a "local address" which is unique among local addresses allocated to entities in the local network. This may enable entities in the local network to communicate with one another using the allocated local addresses and the locally defined communication protocol. Using only the allocated local addresses and locally defined communication protocol, however, each entity in the local network may be limited to communicating with entities in the local network and may not be capable of communicating with other entities in a larger communication network that includes the local network. However, these are merely examples of a local network and embodiments of the present invention are not limited in these respects.

A "gateway" as referred to herein relates to an entity in a local network that is capable of communicating with other entities within or outside of the local network. For example a gateway may be capable of communicating with entities in the local network using allocated local addresses according to a locally defined data communication protocol and also capable of communicating with entities outside of the local network using a different addressing scheme or data communication protocol. Such a gateway may also be capable of forwarding data communications between entities in the local network and entities outside of the local network. However, these are merely examples of a gateway and embodiments of the present invention are not limited in these respects.

The term "network element" as referred to herein represents a network device such as a router, switch, gateway, NIC (network interface controller), or RNIC (RDMA NIC) that is used to transmit a packet to another network element on the local network or via an Internet connection. A network element may also be referred to as a compute node or equivalent. However, these are merely examples of a network element and embodiments of the present invention are not limited in these respects.

The term "network interface controller" (NIC) is a computer circuit board or card that is commonly installed in a computer so that it can be connected to a network. The NIC is sometimes referred to as an adapter or card and may be associated with particular drivers as well. Personal computers and workstations on a LAN typically contain a NIC specifically designed for the particular LAN transmission technology, such as Ethernet or Token Ring. However, these are merely examples of a NIC and embodiments of the present invention are not limited in these respects.

The term "RDMA NIC" (i.e., RNIC, RDMA NIC, or RDMAP NIC) as referred to herein is an RDMAP intelligent NIC because it allows for kernel bypassing by a NIC when appropriate software is executed on a computer system or the like.

The term "network traffic" as referred to herein relates to the volume of information being transmitted across a communication network and is often measured in terms of "bandwidth." Of course, other terms of art could be defined to give an exhaustive background in the area of the present invention, but have been left to the understanding of those of ordinary skill in the art. Thus, these are merely examples of network traffic and embodiments of the present invention are not limited in these respects.

In the following description, specific matter disclosed herein relates to the field of managed runtime environment (MRTE) entities that are aware of processes that adhere to remote direct memory access protocols (RDMAP). Specific details of exemplary embodiments of the present invention are set forth. However, it should be understood by those of ordinary skill in the art that embodiments of the inventive concepts described herein may be implemented using well-known circuits, structures, and techniques that may or may not have been described herein.

The term "program" is intended to have the full breadth of its ordinary meaning. The term 'program' includes 1) a software program which may be stored in a memory or storage medium and is executable by a processor, or 2) a hardware configuration program useable for configuring a programmable hardware element. However, these are merely examples of a program and embodiments of the present invention are not limited in these respects.

The term "software program" as referred to herein is intended to include any type of program instructions, code, script and/or data, or combinations thereof, that may be stored in a storage medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner. However, these are merely examples of a software program and embodiments of the present invention are not limited in these respects.

The term "hardware configuration program" is intended to include a netlist, bit file, or other type of program or data structure that can be used to program or configure a programmable hardware element. However, these are merely examples of a hardware configuration program and embodiments of the present invention are not limited in these respects.

The term "programmable hardware element" as referred to herein is intended to include include various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic". A programmable hardware element may be configured using a hardware configuration program.

The term "machine-readable" instructions as referred to herein relates to expressions which may be understood by one or more machines for performing one or more logical operations. For example, machine-readable instructions may comprise instructions which are interpretable by a processor compiler for executing one or more operations on one or more data objects. However, this is merely an example of machine-readable instructions and embodiments of the present invention are not limited in this respect.

The term "storage medium" as referred to herein relates to media capable of maintaining expressions which are perceivable by one or more machines. For example, a storage medium may comprise one or more storage devices for storing machine-readable instructions or data. Such storage devices may comprise storage media such as, for example, optical, magnetic, flash, or semiconductor storage media. However, these are merely examples of a storage medium and embodiments of the present invention are not limited in these respects. Further, a 'storage medium' is also sometimes referred to as a memory medium, a machine-readable medium, a computer-readable medium, a processor-readable medium, etc., but for purposes of the present disclosure will be referred to only as 'storage medium.'

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or FPGA. Also, logic may comprise machine-readable instructions stored in a storage medium in combination with processing circuitry to execute such machine-readable instructions. However, these are merely examples of structures which may provide logic and embodiments of the present invention are not limited in this respect.

A "processing system" as discussed herein relates to a combination of hardware and software resources for accomplishing computational tasks. However, this is merely an example of a processing system and embodiments of the present invention are not limited in this respect.

A "host processing system" relates to a processing system which may be adapted to communicate with a "peripheral device." For example, a peripheral device may provide inputs to or receive outputs from an application process hosted on the host processing system. However, these are merely examples of a host processing system and a peripheral device, and embodiments of the present invention are not limited in these respects.

A "network software memory program" is a program or software program that contributes to network traffic on a communication network. The network software memory program typically utilizes a network element to access the communication network.

A "software module" as referred to herein may be considered to be a program, a software program, a network software memory program, or other type of machine-readable instruction set that may be stored in a storage medium or the like.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 1 illustrates a general computer system diagram 100 as it might appear while the system operates according to an exemplary embodiment of the present invention using two computer systems 101 and 103.

One communication protocol used in the computer system 100 is TCP/IP 102. However, in other embodiments, personal computers may use other protocols such as Serial Line Internet Protocol (SLIP) or the Point-to-Point Protocol (PPP) or other communication protocol.

The computer may also include an NDIS (Network Driver Interface Specification) network device driver 104. NDIS is a specification for how communication protocol programs (such as TCP/IP) and an NDIS network device driver 104 communicate with NDIS driver 106. NDIS specifies interfaces for:

1. The NDIS driver program 104 sending and receiving data by constructing or extracting it from the formatted units called frame (and sometimes packet or datagram). The NDIS driver program 104 may be configured as a protocol stack, and is layered and generally corresponds to layers 3 and 4 (the Network Addressing and Transport layers) of the Open Systems Interconnection (OSI) reference model. Examples are TCP/IP and Internetwork Packet Exchange.
2. The NDIS driver program 104, configured as a device driver, interacts directly with a NIC, e.g., NIC 108 or other adapter hardware, which may or may not send or receive the data on the communications line in the form of electronic signals. The NDIS driver program 104 and the NIC 108 interact at the Media Access Control (MAC address) sublayer of the layer-2 level of OSI, which is called Data-Link Control. (Putting the signal on the line is the layer-1 or the Physical layer of OSI.) Examples of MAC drivers are those for Ethernet, Fiber Distributed-Data Interface, and Token Ring.
3. A program called the Protocol Manager identifies the computer location of the other computer, e.g., the computer system 103, to the protocol stack program and the MAC driver program when the operating system is started or, in some cases, when a new device is added to the computer. This is called bind. A system file called PROTOCOL.INI identifies which protocol stacks use which MAC drivers and where each is located. A protocol stack can be bound to more than one MAC driver where a computer is connected to multiple networks. And a single MAC driver can be bound to more than one protocol stack in a computer.

A kernel 110 (illustrated in no specific detail for purposes of clarity and understanding the present disclosure) is the center of a computer operating system, i.e., the core of the operating system that provides basic services for all other parts of the operating system. The kernel 110 may include an interrupt handler that handles all requests or completed I/O operations that compete for the kernel's 110 services, a scheduler that determines which programs share the kernel's 110 processing time in what order, and a supervisor that actually gives use of the computer to each process when it is scheduled. The kernel 110 may also include a manager of the operating system's address spaces in memory or storage, sharing these among all components and other users of the kernel's 110 services. The kernel's 110 services are requested by other parts of the operating system or by application through a specified set of program interfaces sometimes known as system calls.

Multimedia applications utilizing broadband and streaming are typically better served when direct memory placement is utilized because direct memory placement allows the CPU to be bypassed 112 by bypassing the kernel 110. Thus, the CPU does not become the bottleneck for certain applications that would otherwise utilize a CPU to carry out their operations.

Figure 2:
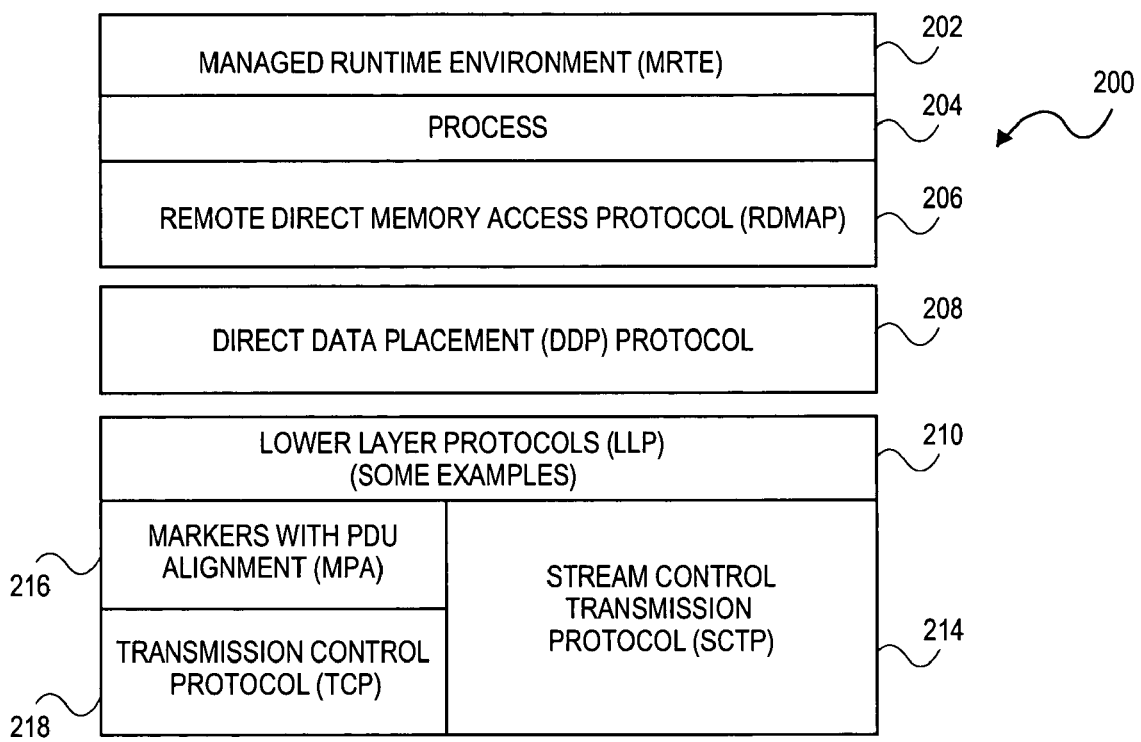
FIG. 2 illustrates relationships among aspects of a communication protocol according to an embodiment of the computer systems shown in FIG. 1.

FIG. 2 illustrates one embodiment of software layers 200 in host processors (not shown) of the computer systems 101 and 103 of the general computer system diagram 100. FIG. 2 is an adaptation of the RDMAP specification's layered architecture and illustrates the layered approach of one embodiment. In general, the layers may be identified as follows: a managed runtime environment layer (or "software development environment") 202 is represented by a layer above a process layer 204 which is the layer above a network software memory process, or process operating according to RDMAP (remote direct memory access protocol) 206.

Beneath the RDMAP layer 206 is a DDP (direct data placement) process layer 208. Below the layers 202, 204, 206, and 208 are the processes operating according to lower layer protocols (LLP) 210, e.g., stream control transmission protocol (SCTP) process 214, markers with PDU alignment (MPA) 216, and transmission control protocol (TCP) process 218.

The present disclosure, in part, follows the semantics followed by RDMAP 206 via APIs following these semantics, as well as modifications to MRTE 202 modules to adapt to the disclosed network to memory buffer placement embodiment. These semantics are followed by the MRTE 202, and are also recognized by the NICs 108, 109 and associated drivers such as the NDIS driver programs 104, 106, etc.

An MRTE 202 module that may be RDMAP 206 aware is the garbage collector (not shown). The MRTE 202 recognizes the means by which certain memory buffers are populated via network transport protocol and associated NIC protocols. For example, a NIC protocol may be a standard IEEE 802.3 interface defined at the physical and/or data-link levels in the OSI model. These buffers (not shown in FIG. 2) are fixed in memory and bypassed by garbage collection operations. The MRTE 202 corrects the application memory buffers that are automatically addressed by RDMAP 206.

RDMAP 206 could also be used to transport byte or native code over the network. This new method of transport and memory buffer placement is recognized by the MRTE 202 JIT compiler and class loader. As stated, the JIT compiler provides platform independence of MRTE applications until runtime. Prior to JIT compilation, an MRTE application is statically compiled to byte code or intermediate language (IL). It is when an application user actually wants to run an MRTE program that the JIT dynamically compiles the byte code or IL to the machine's language. At runtime, the class loader loads the byte code or IL for an application and determines when the JIT compiles a given class or methods within a class, thus converting those classes into machine language.

Application data is also transported by RDMAP 206 that impacts the application MRTE 202 operations in terms of memory heap management and XML data processing. In order to gain many of the benefits of the MRTE protocol 202, the ULP (MRTE) is aware and interacts with RDMAP 206.

Communications over TCP/IP 102 may involve a copy, which add latency and consume significant CPU and memory resources. RDMAP 206 enables removal of data copy operations and enables reduction in latencies by allowing a local application to read or write data on a remote computer's memory with minimal demands on memory bus bandwidth and CPU processing overhead, while preserving memory protection semantics. RDMAP 206 is layered on top of DDP 208 and uses the two buffer models (not shown in FIG. 2) available from DDP 208.

Current MRTE entities make use of the system OS and associated general purpose network drivers, e.g., NDIS driver 104, to interface with network I/O operations. This is contrary to the RDMAP 206 semantic framework and how it is meant to communicate not only with the OS but also the application.

According to an embodiment, the combination of TCP offload and RDMA 206 in the same network adapter may be desireable.

The combination of the process layer 204 with the MRTE layer 202 provides multiple functions. Among other benefits, The MRTE layer 202 is made aware of the RDMA layer 206 so that the overhead of protocol processing in the MRTE layer 202 may be moved to at least the NIC 109. Second, also taking advantage of the RDMA layer 206, the MRTE layer 202 recognizes that each incoming network packet has enough information to allow it be placed directly into the final destination memory. Thus, the process layer 204 allows the MRTE layer 202 to take advantage of the direct data placement property of RDMA 206 which eliminates intermediate memory copies and associated demands on the memory and processor resources of the network elements.

Figure 3:
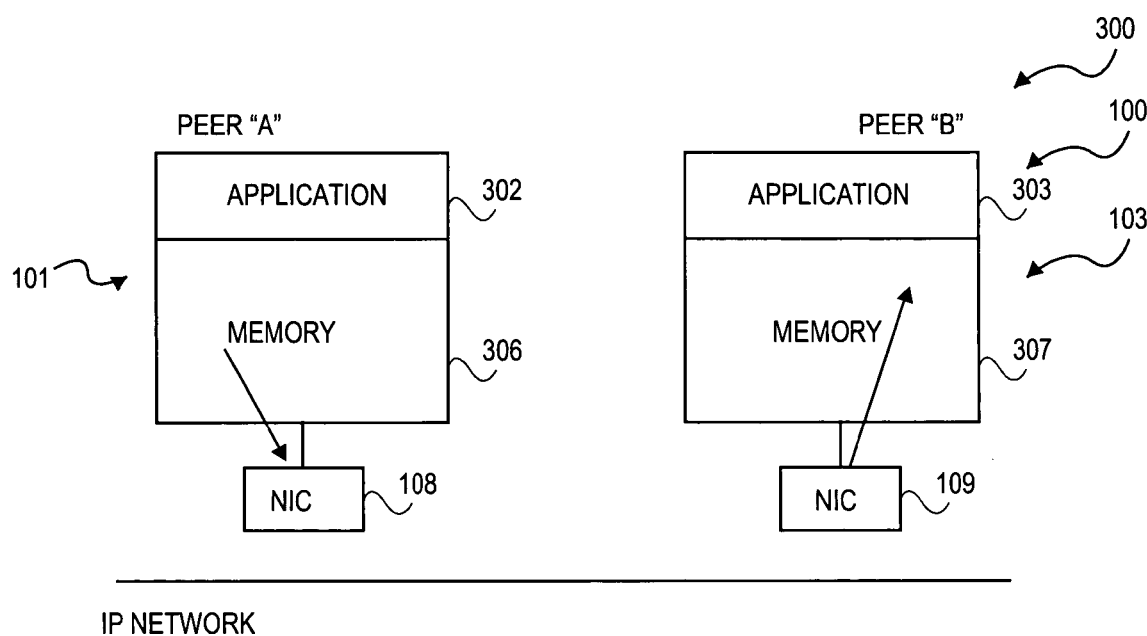
FIG. 3 illustrates a process of communication between two computer systems according to an embodiment of the computer systems shown in FIG. 1.

FIG. 3 illustrates a process of communication 300 of the two computer systems 101, 103. In other words, FIG. 3 illustrates the RDMAP operation in the computer systems 101 and 103 by showing each of the computer systems 101 and 103 as applications 302, 303 (e.g., MRTE and RDMAP programs), memories 306, 307, and NICs 108, 109. As understood by those of ordinary skill in the art and viewing the disclosed embodiments, for purposes of understanding the present disclosure, each of the computer systems 101 and 103 may also be referred to as a "peer". For example, computer system 101 is referred to as peer A in FIG. 3, while computer system 103 is referred to as peer B. Of particular interest is the direct memory communication with the NICs 108 and 109 represented by an arrow between the NIC 108, 109, and memory 306, 307. However, it should be noted that communication between memory 306, 307 and NIC 108, 109 could be in either direction as well as bi-directional or multi-directional.

Figure 4:
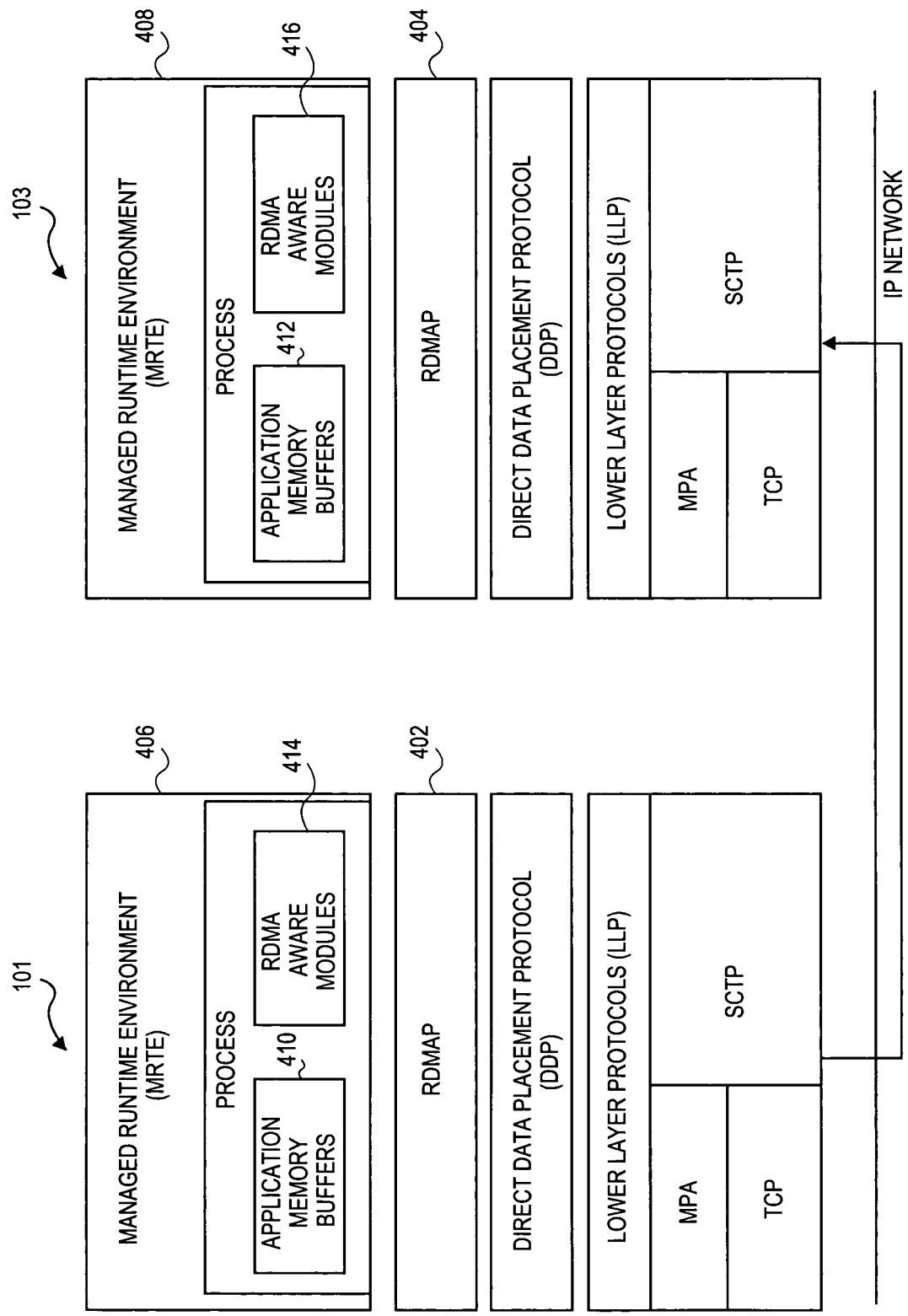
FIG. 4 illustrates an implementation of a managed runtime environment (MRTE) according to an embodiment of the computer systems shown in FIG. 3.

FIG. 4 shows a more detailed illustration of the computer systems 101 and 103 and demonstrates RDMAP high level architecture 402, 404 that enables MRTE 406, 408 to be RDMAP 402, 404 aware, respectively.

The MRTEs 406 and 408 being aware of the RDMAP layers 402 and 404, respectively, provides the MRTEs 406 and 408 with the direct data placement property of RDMA and eliminates intermediate memory copies and associated demands on the memory and processor resources of the network elements with use of MRTE processes at the MRTE layers 406 and 408.

This process modifies the incoming network data path from the NICs 108, 109 directly to MRTE application memory buffers 410, 412, and creates RDMA aware modules (e.g., programs, software programs, etc.) 414, 416 for bypassing 112 the user kernel 110. MRTE engines 406, 408 are equipped to operate with memory being manipulated in such a manner.

When the JITed application code is transported via RDMAP to an MRTE application's memory, the running MRTE 406, 408 is made aware that the recently placed executable code is available. Since the kernel 110 is being bypassed 112 by at least the RDMA NIC 109, the TCP/IP socket will not notify the MRTE 406, 408, as it has in the past. This method of transport and memory buffer 410, 412 placement is recognized by the MRTE 406 and 408 JIT compiler and class loader. This idea describes the mechanism which may be used at the MRTE process layer 202.

RDMAP applications may benefit by both RDMAP 402, 404 and MRTEs 406, 408. Server clusters architected to serve mission critical applications by sharing application load in real-time will benefit from RDMAP's efficient way of sharing memory resident data. As MRTEs become more prevalent, applications may need notification of data placement in server application memory. This area of memory may receive special treatment by the MRTEs 406, 408 garbage collection mechanism.

Multimedia applications utilizing broadband and streaming are typically better served by RDMAP's 402, 404 direct memory placement. The CPU may be bypassed 112 and may not become the bottleneck. Beneficial real-time performance improvements are realized by positioning one or both of the NICs 108, 109 to move media streams from the network and into memory, thus leaving the CPU available for application computational requirement. For MRTE applications, this visible real-time processing advantage may be realized if the MRTE 406, 408 is aware of the memory placement strategy.

RDMAP 402, 404 aware MRTEs 406, 408 differentiate some provider's network interface adaptor cards (e.g., NICs 108, 109) for applications written for MRTEs 406, 408. Without the higher-level user application (or ULP as the RDMAP specification identifies them) being aware of this approach for network to application buffer transfer, RDMAP, on certain provider's network cards, offers little value to managed runtime applications like SOAP (Simple Object Access Protocol) enabled web service data/attachment transfer without the application's MRTE being aware of the RDMA protocol.

When the network "stack" is analyzed, it is revealed that the real issue is memory buffer copying associated with bringing and placing data on the network transport "stack". RDMAP 402, 404 eliminates CPU centric context switches and memory buffer copies, because it is done by the RDMAP intelligent NIC or RNIC 109. In other words, as previously stated, RNIC 109 and possibly NIC 108 are NICs that have RDMAP intelligence and recognize the need to directly post data coming from the network into application memory. RDMAP 402, 404 recognize the issues with network transport processing latency and offer a solution to solve such latency problems as well as other problems that will be understood by those of ordinary skill in the art upon viewing the present disclosure.

While the invention has been described in terms of several embodiments, those of ordinary skill in the art should recognize that the invention is not limited to the embodiments described, but can be practiced with modification and alteration within the spirit and scope of the appended claims. The description is thus to be regarded as illustrative instead of limiting.

What is claimed is:

1. A method comprising:
    encoding a software module to reserve memory space in a managed runtime environment (MRTE) that allows a network software memory program to bypass a central processing unit to access the memory space when just-in-time (JIT) application code is received in the MRTE, the network software memory program operating according to a remote direct memory access protocol (RDMAP), wherein the JIT application code is transported via RDMAP to the MRTE environment; and
    recognizing receipt of the JIT application code with a JIT complier and class loader such that a TCP/IP socket through which the JIT application code is received does not notify the MRTE of the receipt of the JIT application code.

2. The method of claim 1 wherein said encoding the software module comprises programming a managed runtime environment to recognize memory space that is accessible by a remote direct memory program.

3. A computer-readable medium having stored thereon at least one instruction that, when executed by a computer, causes the computer to perform:
    encoding a software module to reserve memory space in a managed runtime environment (MRTE) that allows a network software memory program to bypass a central processing unit to access the memory space when just-in-time (JIT) application code is received in the MRTE, the network software memory program operating according to a remote direct memory access protocol (RDMAP), wherein the JIT application code is transported via RDMAP to the MRTE environment; and
    recognizing receipt of the JIT application code with a JIT complier and class loader such that a TCP/IP socket through which the JIT application code is received does not notify the MRTE of the receipt of the JIT application code.

4. The computer-readable medium of claim 3 wherein the managed runtime environment reserves memory space for direct access by a network software program.

5. The computer-readable medium of claim 3 wherein the computer-readable medium comprises a storage medium comprising an instruction set configured to provide communication between the managed runtime environment and the remote direct memory program.

* * * * *